(12) United States Patent
Winberg

(10) Patent No.: US 7,403,782 B2
(45) Date of Patent: Jul. 22, 2008

(54) DATA TRANSMISSION IN A TELECOMMUNICATIONS NETWORK

(75) Inventor: Mikael Jan Are Winberg, Helsingfors (FI)

(73) Assignee: Telefonaktiebolaget LM Ericsson (PUBL), Stockholm (SE)

(*) Notice: Subject to any disclaimer, the term of this patent is extended or adjusted under 35 U.S.C. 154(b) by 180 days.

(21) Appl. No.: 10/311,909
(22) PCT Filed: Jun. 20, 2001
(86) PCT No.: PCT/EP01/07013

§ 371 (c)(1),
(2), (4) Date: Dec. 20, 2002

(87) PCT Pub. No.: WO02/03738

PCT Pub. Date: Jan. 10, 2002

(65) Prior Publication Data

US 2003/0096619 A1 May 22, 2003

(30) Foreign Application Priority Data

Jul. 1, 2000 (GB) .................... 0016086.1

(51) Int. Cl.
*H04Q 7/20* (2006.01)
(52) U.S. Cl. ............ 455/453; 455/406; 455/446; 455/450; 370/232; 370/401; 370/339; 709/235; 709/238; 709/227
(58) Field of Classification Search ......... 455/453, 455/403, 446, 450; 370/232, 401, 339; 709/235, 709/238, 227
See application file for complete search history.

(56) References Cited

U.S. PATENT DOCUMENTS

| 6,732,175 B1* | 5/2004 | Abjanic .............. 709/227 |
| 6,804,202 B1* | 10/2004 | Hwang .............. 370/282 |
| 6,831,909 B1* | 12/2004 | Koo et al. .............. 370/339 |
| 2001/0027490 A1* | 10/2001 | Fodor et al. .............. 709/238 |

FOREIGN PATENT DOCUMENTS

| WO | WO 99/52307 | 10/1999 |
| WO | WO 99/66748 | 12/1999 |

OTHER PUBLICATIONS

3G TS 25.303 V3.4.0 (Jun. 2000), 3rd Generation Partnership Project; Technical Specification Group Radio Acess Network; Interlayer Procedures in Connected Mode (Release 1999).*
ETSI, "Universal Mobile Telecommunications System (UMTS); QoS Concept and Architecture", (3G TS 23.107 version 3.2.0 Release 1999), XP-002159012, pp. 1-37.

* cited by examiner

*Primary Examiner*—Joseph Feild
*Assistant Examiner*—Pierre-Louis Desir
(74) *Attorney, Agent, or Firm*—Michael Cameron

(57) ABSTRACT

A method of optimizing the use of radio resources in the UTRAN 5,19 of a UMTS network 17, and comprising transferring information, relating to changes in the radio resources available to an application 27 at a UE 1,16 and/or relating to changes in the radio resource demand of the application 27, between the application 27 and a radio resource handling entity of the UTRAN 5,19.

15 Claims, 4 Drawing Sheets

DATA TRANSMISSION IN A TELECOMMUNICATIONS NETWORK

FIELD OF THE INVENTION

The present invention relates to data transmission in a telecommunications network and in particular to data transmission in a Universal Mobile Telecommunications System (UMTS) network.

BACKGROUND TO THE INVENTION

The European Telecommunications Standardisation Institute (ETSI) is currently in the process of standardising a new set of protocols for third generation mobile telecommunications systems. The set of protocols is known collectively as Universal Mobile Telecommunications System (UMTS). FIG. 1 illustrates schematically the logical architecture approach of UMTS, where UE 1 designates User Equipment, BS 2 designates a Base Station, RNC 3 designates a Radio Network Controller, MSC 4 designates a Mobile Switching Centre, and SGSN designates a Serving GPRS Support Node (the MSC and SGSN are illustrated in FIG. 1 by a single entity but in practice are distinct nodes forming parts of respective core networks). The BS 2 and the RNC 3 form part of the UMTS Terrestrial Radio Access Network (UTRAN) 5. The illustrated architecture can be divided into two planes; a non-access plane which contains logical elements, and an access plane which contains all of the radio access and radio specific functionality.

The non-access plane includes an end-user (end-to-end) service 6. This is the logical connection between the UE 1 and an external user 15 (connected to an external network, e.g. PSTN, Internet, etc) using an external transport function 7. A UMTS service 8 uses a transport service 9 between the MSC 4 and the external core networks and services provided by the UTRAN.

The access plane includes the logical functionality and services represented by the blocks 10 to 14. The UMTS Radio Access Bearer (RAB) service 10 provides a transport connection service through the UTRAN, which uses Asynchronous Transfer Mode (ATM) through the blocks 11 and 12. WCDMA radio traffic channels 13 are allocated by the controllers in the RNC 3 and are physically implemented by the BS 2 over the radio interface to the UE 1. Block 14 represents the actual radio link resources which in a WCDMA system correspond to individual CDMA spreading codes.

In order to initiate a RAB service, a request for communication with a UE 1 is transmitted from the core network to the UTRAN 5. One or more parameters accompany the RAB service request. When establishing a RAB, the UTRAN flexibly maps or allocates the RAB to physical transport 11,12 and radio channel 14 resources through the UTRAN 5 and over the air interface respectively. The mapping is based upon one or more of the parameters associated with the RAB service request. During a connection, the UTRAN may change the radio resources allocated to a RAB in order to optimise the total usage of resources in UTRAN with respect to interference levels, capacity, coverage, etc. The core network is not informed about such changes in the allocated radio resources so long as the connection remains within the "service contract" defined at RAB establishment.

Two types of radio channels 14 are defined in UMTS. A "dedicated" channel (dch) exists where a CDMA spreading code is allocated to a single MS, whilst a "common" channel (cch) exists when the resources afforded by a spreading code are divided amongst two or more MSs. The choice of whether to allocate a common channel or a dedicated channel to a given RAB is made by a Radio Resource Controller of the serving RNC 3, and depends upon the actual data transfer requirements of the MS 1. The allocation is dynamic in so far as switching between common and dedicated channels may occur for a given RAB during a connection, as the level of data to be transferred varies. UTRAN radio resource handling may therefore change the radio resources allocated to a RAB by switching between common and dedicated channels, or by changing the allowed data rate on dedicated channels.

STATEMENT OF THE INVENTION

Under current proposals, the radio resource handling performed by the UTRAN within the limits of the specification of the RAB (and thus not communicated to the core network) does not provide for any exchange of information between the UTRAN and the application in the UE which is using these radio resources. In particular, and by way of example, channel switching between a common channel and a dedicated channel is based upon traffic volume measurements within the RLC/MAC layer alone. As the UTRAN requires a certain amount of time to complete a channel switch, a significant delay may occur following a rise in data volume. This may in turn cause a delay in transferring data to and from the MS, and may cause buffers in the RNC to overflow.

In many cases, the absence of any communication between the UE application and the resource handling in the UTRAN results in an imbalance between the allocated radio resources and the demands of the application. It is possible that such an imbalance may be avoided if either the UTRAN is able to adapt to the requirements of the application and/or the application is able to adapt to the allocated resources.

The inventor of the present invention has recognised this problem, and moreover has realised that the problem may be avoided or at least mitigated if the application in the UE is able to communicate (via the radio resource handling of the UE) with the radio resource handling in the UTRAN, to signal in advance to the UTRAN the need for increased transmission radio resources, or to receive an indication when the radio resources allocated to the UE by the UTRAN has been, or is about to be, changed.

According to a first aspect of the present invention there is provided a method of optimising the use of radio resources in the UTRAN of a UMTS network, and comprising transferring information, relating to changes in the radio resources available to an application at a UE and/or relating to changes in the radio resource demand of the application, between the application and a radio resource handling entity of the UTRAN.

Preferably, said changes relate to changes in bandwidth (user data rate) available to an application at a UE and/or to changes in the demand for bandwidth. Alternatively however, the changes may relate to other characteristics of the radio resources.

Preferably, the method comprises sending a request for a switch from a common channel to a dedicated channel allocated to a Radio Access Bearer (RAB) by the UTRAN, from said application of the UE to the radio resource handling entity of the UTRAN; and receiving the request at said radio resource handling entity and performing said switch.

Preferably, the method comprises monitoring anticipated future traffic volume, at the UE, and sending said request when the anticipated future traffic volume reaches a predefined level, but prior to that anticipated volume being achieved. The switch from the common channel to the dedicated channel is then also made prior to the anticipated volume being achieved.

Preferably, monitoring of anticipated future traffic volume is carried out by the application in the UE. Requests for changes in the radio resources are transferred to the radio resource handling entity of the UE via an interface. More preferably, this interface may form part of an operating system environment provided to applications in the UE. An example of a user application is a web browser.

Preferably, the request for a channel switch sent from the UE is interpreted by the radio resource handling entity of the UE and is sent from that entity to the radio resource handling entity of the UTRAN as a RRC Measurement Report.

It will be appreciated that the radio resource handling entity of the UTRAN may be arranged to dynamically switch between common and dedicated channels for a given RAB, depending upon traffic volumes detected by the radio resource handling entity. The present invention is supplementary to this dynamic switching process, and effectively overrides the process when the UE expects a future increase in traffic volume. In order to prevent the dynamic process reversing a previously requested switch to a dedicated channel prior to the anticipated volume reaching the radio resource handling entity, a level of "hysteresis" may be introduced into the dynamic process. For example, a time period may be defined following a switch during which no further switch may occur.

According to a second aspect of the present invention there is provided a UMTS telecommunication system comprising:
  User Equipment (UE); and
  a radio resource handling entity located in the UTRAN of the UMTS system, the radio resource handling entity being responsible for allocating radio resources to the UE,
  wherein an application of the UE and the radio resource handling entity are arranged to transfer information relating to changes in the radio resources available to an application at a UE and/or relating to changes in the radio resource demand of the application between each other.

According to a third aspect of the present invention there is provided User Equipment for use in a UMTS telecommunications system, the User Equipment comprising means for receiving and/or sending information relating to changes in the radio resources available to an application at a UE and/or relating to changes in the radio resource demand of the application between each other, to or from a radio resource handling entity located in the UTRAN of the UMTS system.

DETAILED DESCRIPTION OF A PREFERRED EMBODIMENT

Figure 1:
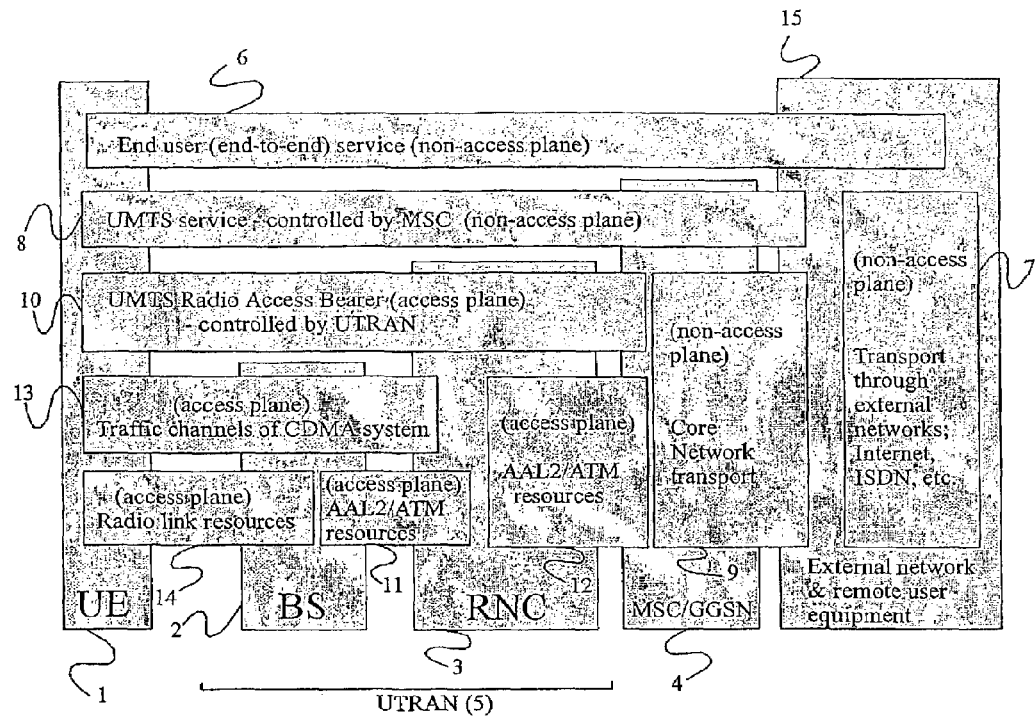
FIG. 1 illustrates schematically the logical architecture of a UMTS telecommunications network.
Figure 2:
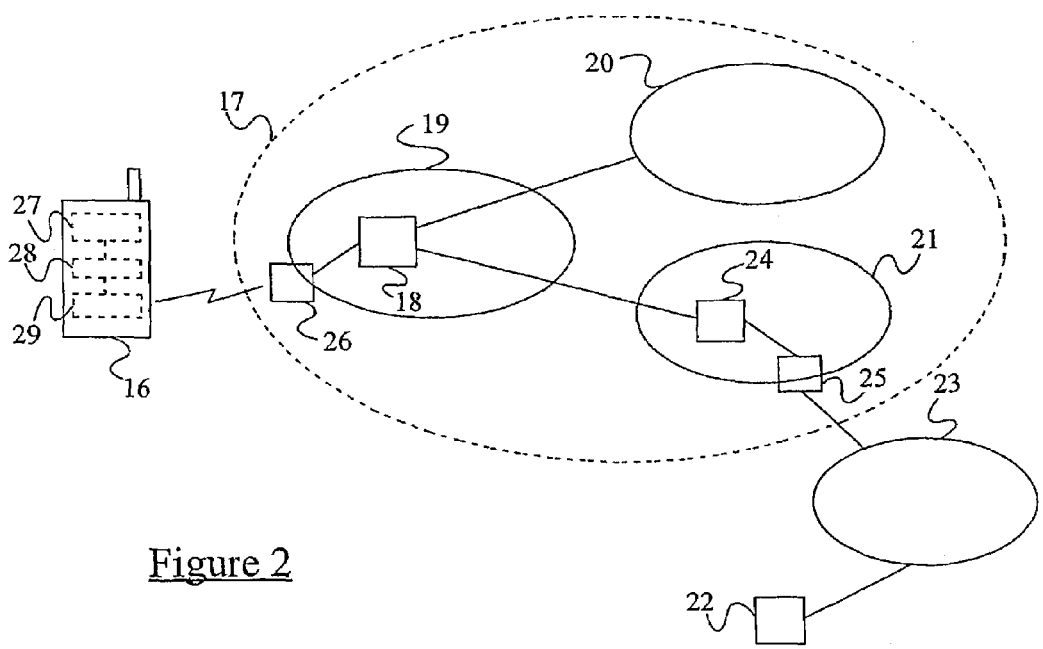
FIG. 2 illustrates a communications system comprising a UMTS network.

The general architecture of a UMTS system has been described above with reference to FIG. 1. FIG. 2 illustrates schematically a User Equipment (UE) 16 which may be an Internet enabled mobile station (MS), a laptop computer connected to a mobile telephone, or the like. The UE 16 conforms to the UMTS standards and its user is a subscriber to a UMTS network indicated generally by the reference numeral 17 in FIG. 2. When the UE 16 is on, it registers with a Radio Network Controller (RNC) 18 of the UMTS Terrestrial Radio Access Network (UTRAN) 19 of the UMTS network 17, via a Base Station (BS) 26. This RNC 18 is referred to as the serving RNC for the UE 16.

As outlined above, it is the UTRAN 19 which is responsible for setting up and tearing down RABs in accordance with RAB requests received from a core network of the UMTS network 17 (which in turn may be a response to a connection request received by the core network from the UE). More particularly, these functions are provided by a radio resource handling entity of the RNC 18. Two core networks are illustrated in FIG. 2: a circuit switched core network 20 and a GPRS packet switched core network 21. For the purpose of the following discussion, it is assumed that a RAB has been allocated to the UE 16 by the UTRAN 19 for the purpose of data transfer between the UE 16 and a Correspondent Host (CH) 22 which is coupled to the Internet 23. Whilst the RAB "connects" the UE 16 to a GPRS Gateway Support Node (GGSN) 24 of the GPRS core network 21, a Network Access Server (NAS) 25 connects the GGSN 24 to the Internet 13.

Figure 3:
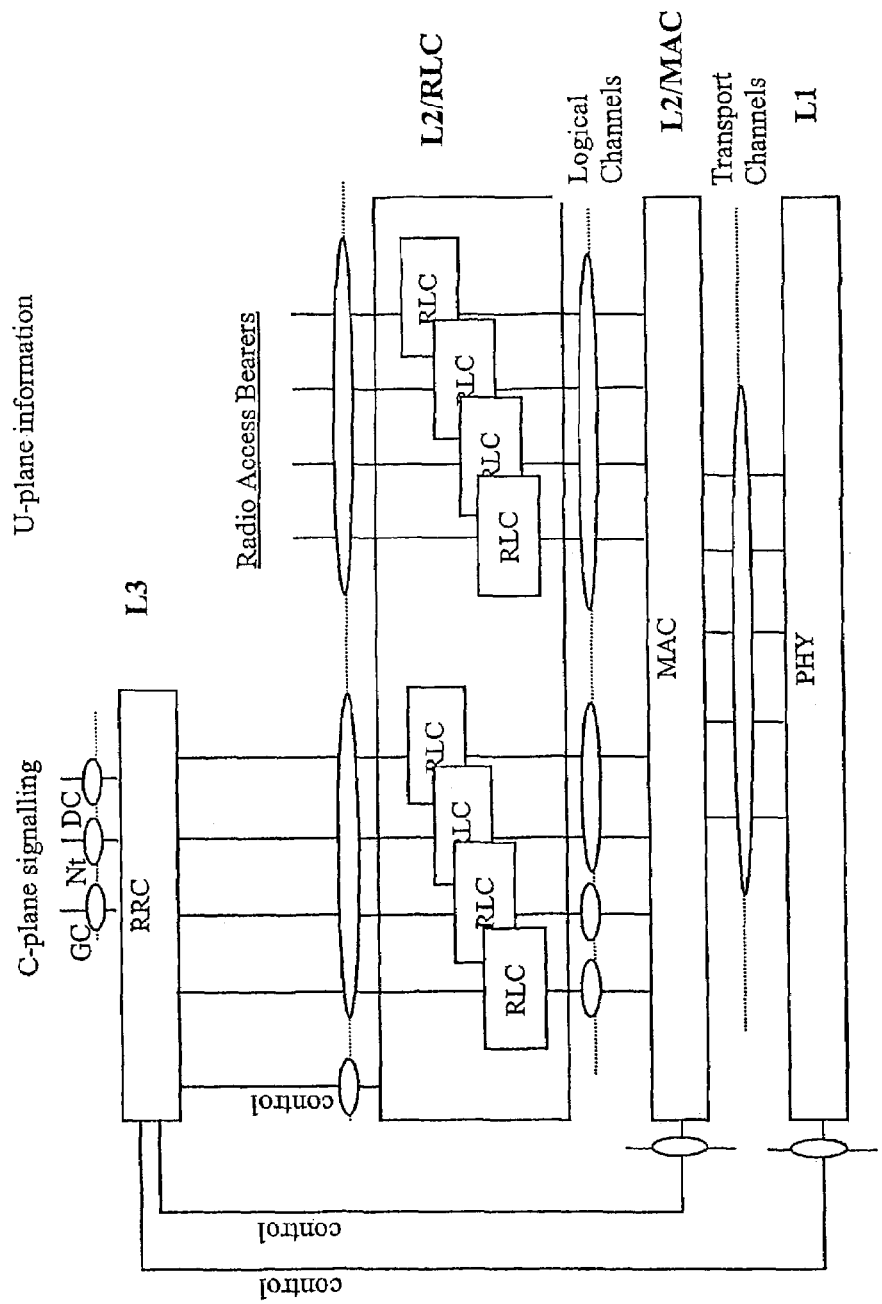
FIG. 3 illustrates in more detail the architecture of a RNC of the UMTS network of FIG. 2.

FIG. 3 illustrates in more detail the architecture of the RNC 18. The layer 2 structure of this architecture consists of a set of Radio Access Bearers (RABs) which make available radio resources (and services) to user applications. For each active UE there may be one or several RABs. Data flows (in the form of segments) from the RABs are passed to respective Radio Link Control (RLC) entities which amongst other tasks buffer the received data segments. There is one RLC entity for each RAB. In the RLC layer, RABs are mapped onto respective logical channels. A Medium Access Control (MAC) entity receives data transmitted in the logical channels and further maps logical channels onto a set of transport channels. Transport channels are finally mapped to a single physical transport channel which has a total bandwidth (<2 Mbits/sec) allocated to it by the network. As already described above, depending upon whether a physical channel is used exclusively by one UE or is shared between many UEs, it is referred to as either a dedicated physical channel or a common channel.

A decision upon whether to allocate a common channel or a dedicated channel to a given UE (or RAB) is made by a Radio Resource Controller (RRC), i.e. the radio resource handling entity. The relevant standard currently allows the RRC to allocate one of a common channel and a dedicated channel to a RAB, and to subsequently switch to the other form of channel if the traffic volume associated with the RAB changes so as to make the switch appropriate. In addition to this conventional switching mechanism, in the embodiment described here there is provided within the UE a facility for monitoring anticipated future RAB traffic volumes. This monitoring function is performed within the user application 27 (for example a web browser), with notifications being sent to the Radio Resource Controller (RRC) 29 of the UE 16 via a Service Access Point (SAP) 28. In one example, the user application 27 is arranged to detect an outgoing request for data to be downloaded to the UE 16 from the CH 22.

Upon receipt of a notification from the SAP 28 (that an increase in traffic volume is expected), the RRC 29 sends a simulated RRC Measurement Report to the peer RRC of the serving RNC 18. This report is sent at substantially the same time as the download request is sent from the UE 16 to the CH 22. The RRC of the RNC 18 responds to receipt of the RRC Measurement Report by immediately initiating the channel switch: the MAC entity is informed of the switch. In the meantime, the download request is forwarded to the CH 22 via the GPRS core network 21 and the Internet 23. The CH 22 responds to receipt of the request by transferring the requested information to the serving RNC 18 via the Internet 23 and the core network 21. By the time the information arrives at the RNC 18, the channel switch has been completed, and a dedicated channel is available to transfer the information from the UTRAN 19 to the UE 16.

After the information has been transferred to the UE 16, the RAB traffic volume may fall to a quiescent level. This is detected by the RRC of the RNC 18, which initiates a further channel switch, back to a common channel. The process may be repeated each time an Internet download request is detected. It will be appreciated that there may be a short delay between a switch to a dedicated channel being completed and the requested information arriving at the RNC 18 from the CH 22. In order to prevent the RRC of the RNC 18 switching back to a common channel during this period, sufficient "hysteresis" should be introduced into the switching period, i.e. a time period can be defined following a channel switch during which no further channel switch can occur.

Figure 4:
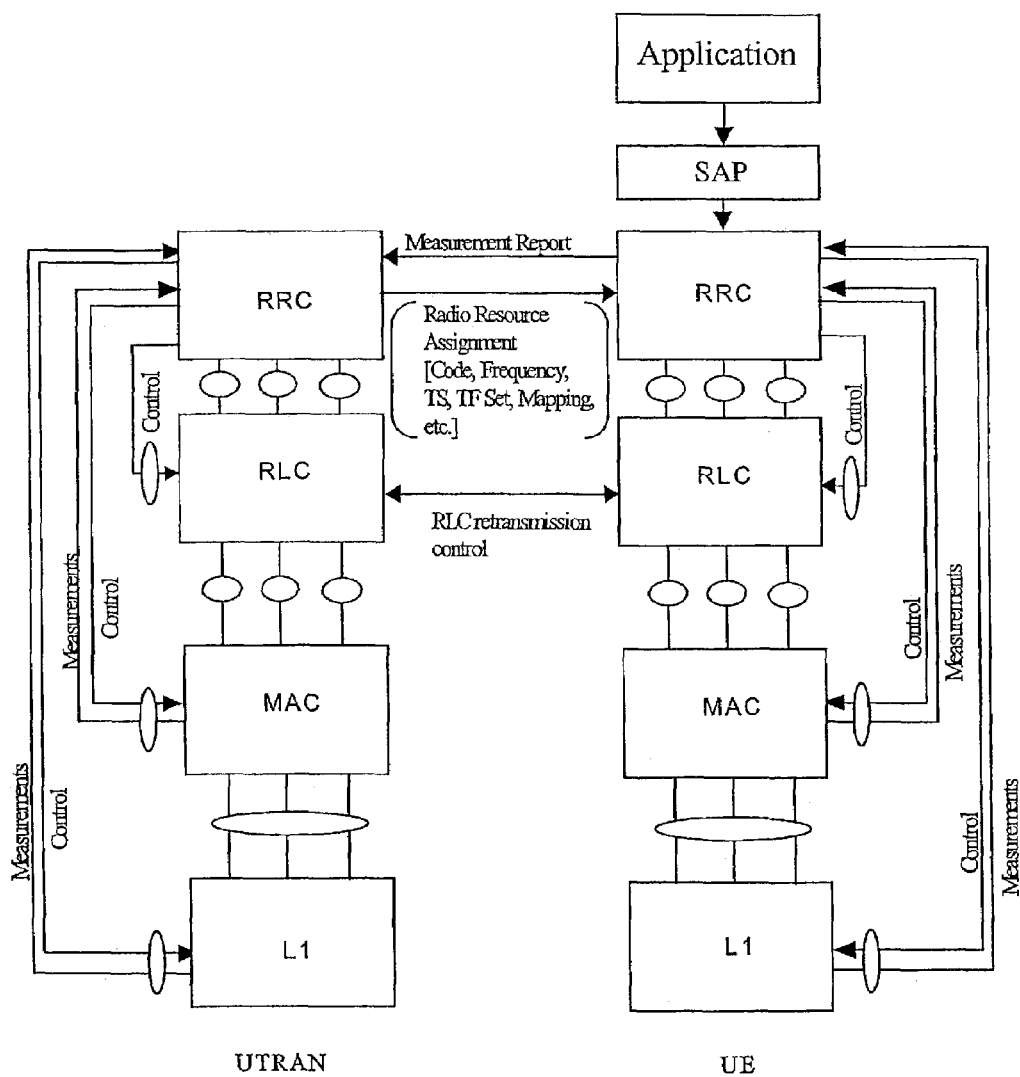
FIG. 4 illustrates the signalling layers at a UE and RNC of the network of FIG. 1.
Figure 5:
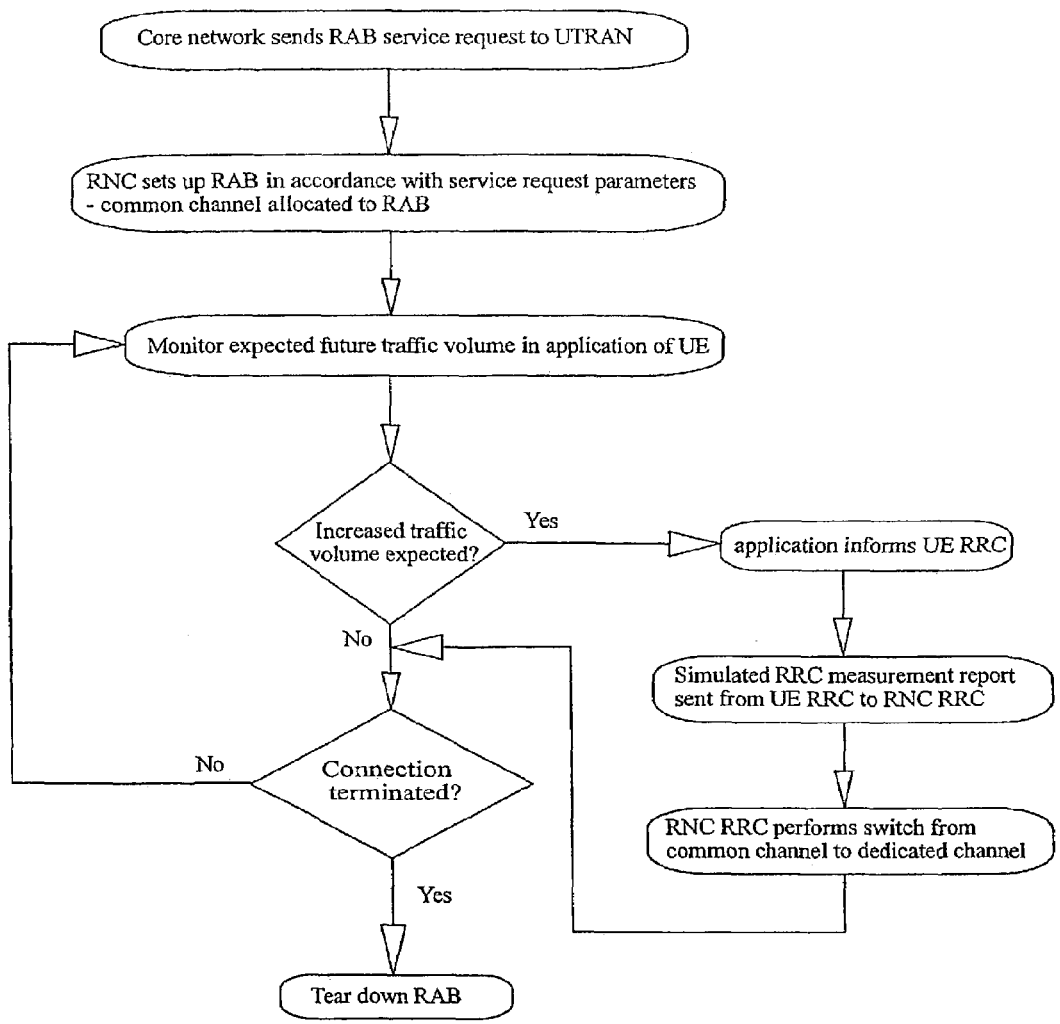
FIG. 5 is a flow diagram illustrating a method of requesting a channel switch in the UMTS system of FIG. 1.

FIG. 4 illustrates in further detail the signalling layers present in the UE 1 and the RNC 18. FIG. 5 is a flow diagram further illustrating the method of initiating a channel switch based upon conditions monitored at the UE.

It will be appreciated by the person of skill in the art that various modifications may be made to the embodiments described above without departing from the scope of the present invention. For example, rather than the UE informing the UTRAN of a future bandwidth requirement, the UTRAN may inform the UE of a change (or imminent change) in the bandwidth allocated to a RAB associated with the UE. Information concerning changed bandwidth is identified to the UE when the changes are ordered by the UTRAN using standard Radio Resource Control (RRC) procedures. Upon reception of the RRC messages at the radio resource handling entity of the UE, the appropriate application is notified. Such a mechanism may be used to instruct a video codec scheme operating in a UE to optimally use the available bandwidth.

The invention claimed is:

1. A method of optimizing radio resources in the UMTS terrestrial radio access network (UTRAN) of a Universal Mobile Telecommunications System (UMTS) network when using a user equipment (UE) to perform internet downloads, comprising:

transferring information relating to changes in the radio resources available to web browser application at a user equipment (UE) and/or relating to changes in the radio resource demand of the application, between the application at the UE and a radio resource handling entity of the UTRAN;

monitoring anticipated future traffic volume by the web browser at the UE by detecting an outgoing request for data to be downloaded to the UE from a Correspondent Host (CH);

sending a request by the web browser application of the UE to the radio resource controller (RRC) of the UTRAN for a switch from a common channel to a dedicated channel allocated to a Radio Access Bearer (RAB) by the UTRAN when the anticipated future traffic volume reaches a predefined level, but prior to that anticipated volume being achieved;

receiving the request at the radio resource handling entity; and performing the switch prior to the anticipated volume being achieved.

2. The method according to claim 1, further comprising communicating the anticipated future traffic volume to the RRC layer of the UE through an interface.

3. The method according to claim 2, wherein the interface is included in an operating system environment provided to the web browser application in the UE.

4. The method according to claim 2, further comprising:

interpreting, by a radio resource handling entity of the UE, the request for a switch from a common channel to a dedicated channel; and sending the request for a switch from a common channel to a dedicated channel from the radio resource handling entity of the UE to the radio resource handling entity of the UTRAN as a simulated RRC Measurement Report.

5. The method according to claim 2, further comprising arranging the radio resource handling entity of the UTRAN to dynamically switch between common and dedicated channels for a given RAB, depending upon anticipated traffic volumes detected by the radio resource handling entity of the UTRAN.

6. The method according to claim 5, further comprising introducing a level of hysteresis in the dynamic process to prevent the dynamic process reversing a previously requested switch to a dedicated channel prior to the anticipated volume reaching the radio resource handling entity of the UTRAN.

7. A universal mobile telecommunications system (UMTS) subsystem adapted to facilitate internet downloads, comprising:

a user equipment (UE);

a radio resource handling entity located in the UMTS terrestrial radio access network (UTRAN) of the UMTS system, the radio resource handling entity of the UTRAN being responsible for allocating radio resources to the UE;

a web browser application in the UE being adapted to monitor anticipated future traffic volume due to an application and, when the anticipated future traffic volume reaches a predefined level, but prior to the anticipated volume being achieved, the UE being adapted to send a request for a switch from a common channel to a dedicated channel allocated to a Radio Access Bearer (RAB) by the UTRAN, to the radio resource handling entity of the UTRAN, and the radio resource handling entity of the UTRAN being adapted to receive the request and perform the switch prior to the anticipated volume being achieved.

8. A user equipment (UE) adapted to perform Internet downloads in a UMTS telecommunications system, the UE comprising:

hardware and web browser software means adapted to monitor anticipated future traffic volume due to an application and send a request to switch from a common channel to a dedicated channel allocated to a Radio Access Bearer (RAB) by a UTRAN, to a radio resource handling entity of the UTRAN when the anticipated future traffic volume reaches a predefined level, but prior to that anticipated volume being achieved.

9. The UE according to claim 8, further comprising:

means adapted to communicate the anticipated future traffic volume to the RRC layer of the UE through an interface.

10. The UE according to claim 9, wherein the interface is included in an operating system environment provided to the web browser application in the UE.

11. The UE according to claim 10, further comprising:
means adapted to interpret, by a radio resource handling entity of the UE, the request for a switch from a common channel to a dedicated channel; and
means adapted to send the request for the switch from a common channel to a dedicated channel as a simulated RRC Measurement Report.

12. The UE according to claim 11, wherein the radio resource handling entity of the UTRAN is adapted to dynamically switch between common and dedicated channels for a given RAB, depending upon anticipated traffic volumes detected by the radio resource handling entity of the UTRAN.

13. The method according to claim 5, further comprising introducing a level of hysteresis in the dynamic process to prevent the dynamic process reversing a previously requested switch to a dedicated channel prior to the anticipated volume reaching the radio resource handling entity of the UTRAN.

14. The UMTS subsystem of claim 7, wherein the UE is adapted to detect an outgoing request for Internet data to be downloaded to the UE from a Correspondent Host (CH).

15. The UE of claim 8, further comprising means adapted to detect an outgoing request for Internet data to be downloaded to the UE from a Correspondent Host (CH).

* * * * *

UNITED STATES PATENT AND TRADEMARK OFFICE
CERTIFICATE OF CORRECTION

| | | |
|---|---|---|
| PATENT NO. | : 7,403,782 B2 | Page 1 of 1 |
| APPLICATION NO. | : 10/311909 | |
| DATED | : July 22, 2008 | |
| INVENTOR(S) | : Winberg | |

It is certified that error appears in the above-identified patent and that said Letters Patent is hereby corrected as shown below:

On the Title Page, Item (58), under "Field of Classification Search", in Column 1, Line 2, delete "455/403," and insert -- 455/406, --, therefor.

Signed and Sealed this

Twenty-eighth Day of October, 2008

JON W. DUDAS
*Director of the United States Patent and Trademark Office*